US008775087B1

(12) United States Patent
Selman et al.

(10) Patent No.: US 8,775,087 B1
(45) Date of Patent: *Jul. 8, 2014

(54) SYSTEM FOR ACQUIRING AND DISPLAYING IN NEAR REAL TIME GAS ANALYSIS, WELL DATA COLLECTION, AND OTHER WELL LOGGING DATA

(71) Applicant: Selman and Associates, Ltd., Midland, TX (US)

(72) Inventors: Thomas H. Selman, Midland, TX (US); Matthew J. Jennings, Midland, TX (US)

(73) Assignee: Selman and Associates, Ltd., Midland, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/754,804

(22) Filed: Jan. 30, 2013

Related U.S. Application Data

(63) Continuation-in-part of application No. 13/029,666, filed on Feb. 17, 2011.

(51) Int. Cl.
*G01V 1/40* (2006.01)
*G06F 17/00* (2006.01)
(52) U.S. Cl.
CPC ..................................... *G06F 17/00* (2013.01)
USPC ........ 702/9; 702/6; 702/11; 702/188; 367/25; 166/264; 73/152.02; 73/152.04; 175/40
(58) Field of Classification Search
USPC ............ 702/6, 9, 11, 188; 175/40; 73/152.02, 73/152.04; 367/25; 166/264
See application file for complete search history.

(56) References Cited

U.S. PATENT DOCUMENTS

| | | |
|---|---|---|
| 2,752,777 A | 10/1950 | Jacobs et al. |
| 2,752,776 A | 4/1954 | Kapff et al. |
| 4,272,258 A | 6/1981 | Shifflett |
| 4,358,298 A | 11/1982 | Ratcliff |
| 4,414,651 A | 11/1983 | Buckner |
| 4,565,086 A | 1/1986 | Orr, Jr. |
| 4,616,321 A | 10/1986 | Chan |
| 4,670,139 A | 6/1987 | Spruiell et al. |
| 4,831,559 A | 5/1989 | Miller |
| 5,058,674 A | 10/1991 | Schultz et al. |
| 5,199,509 A | 4/1993 | Wright et al. |
| 5,237,539 A | 8/1993 | Selman |
| 5,329,811 A | 7/1994 | Schultz et al. |
| 5,648,603 A | 7/1997 | Hanson |

(Continued)

OTHER PUBLICATIONS

Detlev Helmig, Air analysis by gas chromatography, Journal of Chromatography A, 843 (1999) 129-146.*

*Primary Examiner* — Andrew Schechter
*Assistant Examiner* — John Kuan
(74) *Attorney, Agent, or Firm* — Buskop Law Group, PC; Wendy Buskop

(57) ABSTRACT

The system includes a gas processor with gas processor data storage and computer instructions to receive in various device protocols simultaneously information from rig based sensors and gas analysis devices drilling data, calibrate the devices and graphically present the data using both time events and depth events. Computer instructions scale the data and form the geological-hydrocarbon executive dashboard for transmission to various client devices to present real time streaming data, real time calibration information, real time alarms while enabling users to add and remove detection devices and sensors, including rig servers and remote servers, online without shutting down the entire monitoring and analysis system.

15 Claims, 7 Drawing Sheets

(56) References Cited

U.S. PATENT DOCUMENTS

| | | | |
|---|---|---|---|
| 5,869,343 A | 2/1999 | Handschuck et al. | |
| 6,073,709 A | 6/2000 | Hensley | |
| 6,195,092 B1 * | 2/2001 | Dhond et al. | 715/763 |
| 6,290,000 B1 * | 9/2001 | Zamfes | 175/50 |
| 6,496,309 B1 | 12/2002 | Bliton et al. | |
| 6,505,523 B1 | 1/2003 | Taylor et al. | |
| 6,546,818 B2 | 4/2003 | Taylor et al. | |
| 6,609,433 B2 | 8/2003 | Taylor et al. | |
| 6,666,099 B2 | 12/2003 | Taylor | |
| 6,760,665 B1 * | 7/2004 | Francis | 702/6 |
| 7,099,003 B2 | 8/2006 | Saptari et al. | |
| 7,219,541 B2 | 5/2007 | DiFoggio et al. | |
| 7,844,400 B1 | 11/2010 | Selman et al. | |
| 7,957,903 B1 | 6/2011 | Selman et al. | |
| 8,132,452 B1 | 3/2012 | Selman et al. | |
| 8,204,717 B2 | 6/2012 | McLaughlin et al. | |
| 8,705,318 B2 * | 4/2014 | Zheng et al. | 367/81 |
| 2005/0171701 A1 * | 8/2005 | Smith et al. | 702/19 |
| 2006/0239118 A1 * | 10/2006 | Guidry et al. | 367/68 |
| 2007/0050154 A1 | 3/2007 | Albahri | |
| 2008/0208475 A1 * | 8/2008 | Karr et al. | 702/6 |
| 2009/0132458 A1 * | 5/2009 | Edwards et al. | 706/50 |
| 2010/0027004 A1 | 2/2010 | Bonyuet et al. | |
| 2010/0089120 A1 | 4/2010 | Hanson | |
| 2010/0175467 A1 | 7/2010 | DiFoggio et al. | |
| 2011/0071810 A1 * | 3/2011 | Yeriazarian et al. | 703/10 |
| 2011/0308391 A1 | 12/2011 | DeGreeve et al. | |

* cited by examiner

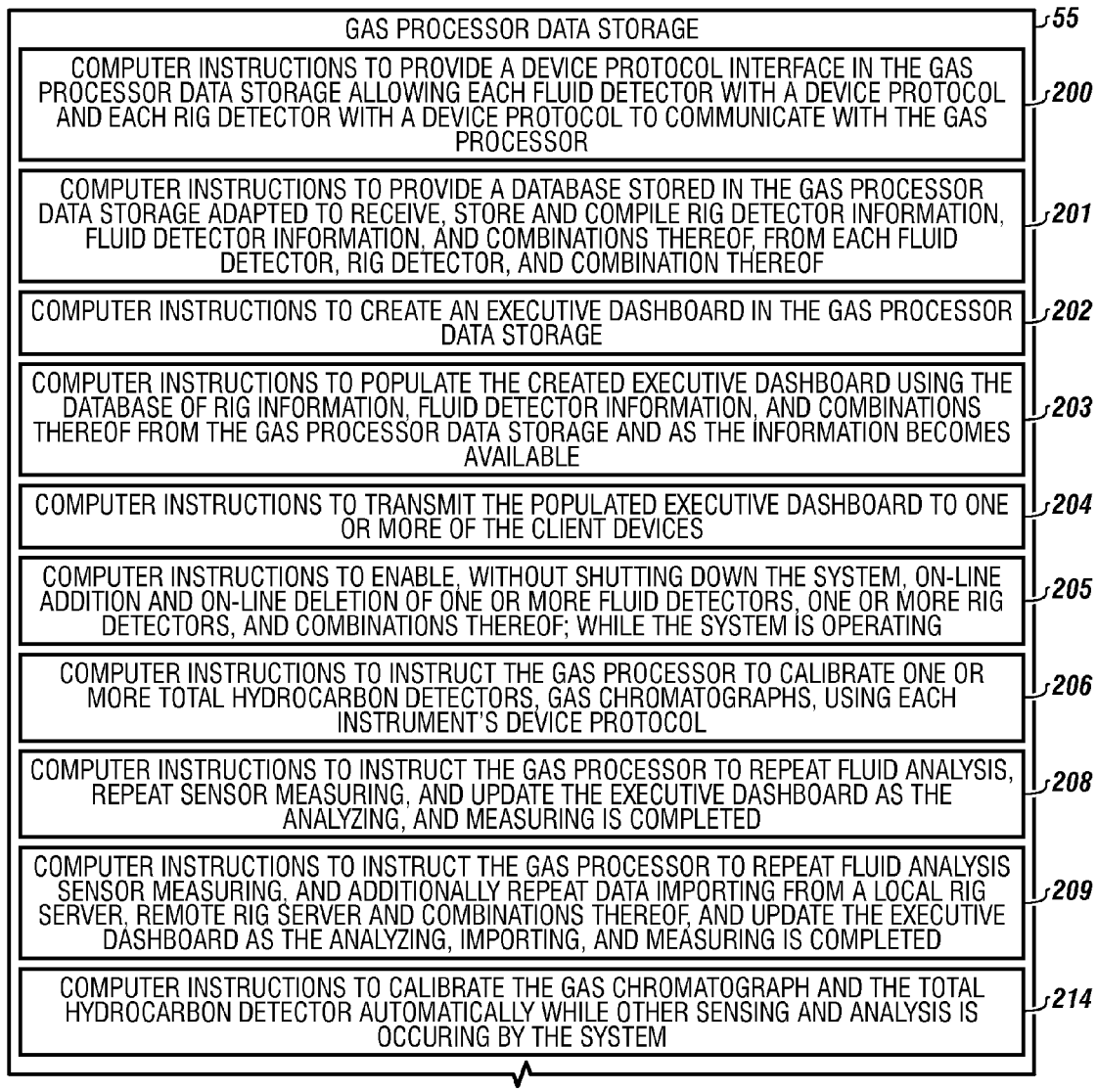

| | |
|---|---|
| COMPUTER INSTRUCTIONS TO FORM AN IDENTIFIER FOR THE DATA BEING TRACKED ON THE EXECUTIVE DASHBOARD | 270 |
| COMPUTER INSTRUCTIONS TO FORM A SWITCH INDEX MODE BUTTON ON THE EXECUTIVE DASHBOARD | 272 |
| COMPUTER INSTRUCTIONS TO FORM A LAYOUT DATA TRACKS BUTTON TO CONTROL OF THE SIZE, NUMBER, AND TYPE OF DATA TRACKS ON THE SCREEN ON THE EXECUTIVE DASHBOARD | 274 |
| COMPUTER INSTRUCTIONS TO FORM AN UPPER SCALE BOUND SECTION ON THE EXECUTIVE DASHBOARD | 276 |
| COMPUTER INSTRUCTIONS TO FORM A LOWER SCALE BOUND SECTION ON THE EXECUTIVE DASHBOARD | 278 |
| COMPUTER INSTRUCTIONS TO FORM A MENU BUTTON ON THE EXECUTIVE DASHBOARD | 280 |
| COMPUTER INSTRUCTIONS TO FORM A SCROLL LEFT BUTTON, A SCROLL RIGHT BUTTON, A ZOOM IN BUTTON, A SCROLL DOWN BUTTON, A SCROLL UP BUTTON, AND A ZOOM OUT BUTTON ON THE EXECUTIVE DASHBOARD | 282 |
| COMPUTER INSTRUCTIONS TO FORM AN ALARM INDICATOR THAT CAN CHANGE COLOR TO INDICATE IF THE ALARM IS ON OR OFF ON THE EXECUTIVE DASHBOARD | 284 |
| COMPUTER INSTRUCTIONS TO FORM A "MY TOOL" BUTTON ON THE EXECUTIVE DASHBOARD | 286 |
| COMPUTER INSTRUCTIONS TO FORM A HELP BUTTON ON THE EXECUTIVE DASHBOARD | 288 |
| COMPUTER INSTRUCTIONS TO PRESENT THE CALIBRATED DATA ON THE OPERATOR DASHBOARD | 290 |
| COMPUTER INSTRUCTIONS TO PRESENT A GRAPHICAL REPRESENTATION OF ACQUIRED CHROMATOGRAPHIC DATA ON THE OPERATOR DASHBOARD | 292 |
| COMPUTER INSTRUCTIONS TO PRESENT THE OPERATOR DATA TRACK SECTIONS ON THE OPERATOR DASHBOARD | 293 |
| COMPUTER INSTRUCTIONS TO PRESENT AN ACQUIRED DATA SECTION ON THE OPERATOR DASHBOARD | 294 |
| COMPUTER INSTRUCTIONS TO PRESENT A CALIBRATED DRILLING DATA SECTION AND AN ALARM SET SECTION ON THE OPERATOR DASHBOARD | 295 |

FIGURE 2C

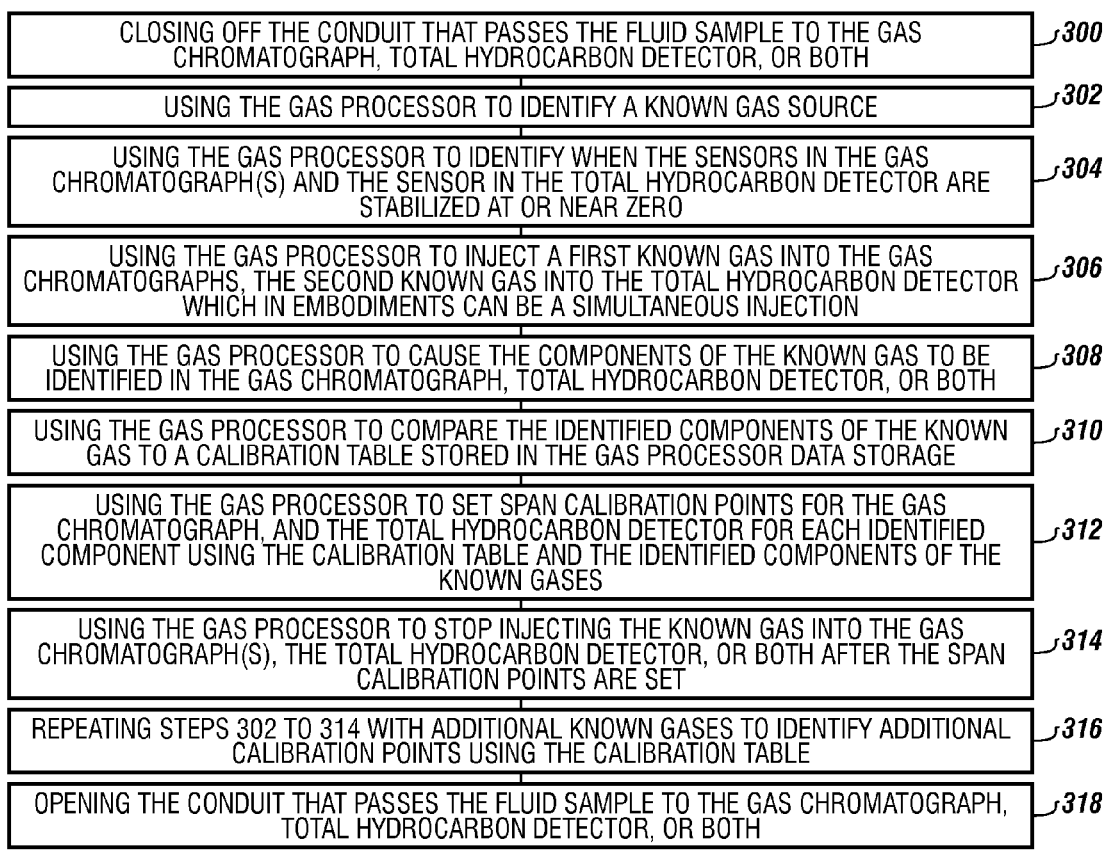

SYSTEM FOR ACQUIRING AND DISPLAYING IN NEAR REAL TIME GAS ANALYSIS, WELL DATA COLLECTION, AND OTHER WELL LOGGING DATA

CROSS REFERENCE TO RELATED APPLICATION

The current application is a continuation in part and claims priority to U.S. patent application Ser. No. 13/029,666 filed on Feb. 17, 2011, entitled "SYSTEM FOR GAS DETECTION, WELL DATA COLLECTION, AND REAL TIME STREAMING OF WELL LOGGING DATA". This reference is incorporated in its entirety.

FIELD

The present embodiments generally relate to a system for capturing surface data and calculating calibrated data in real time to a user via an executive dashboard of surface logs during the drilling of a well, during work over of a well, after drilling a well, and combinations thereof.

BACKGROUND

A need exists for real-time streaming of data and calibrated data from a rig to avoid explosions, fires, and blowouts on a rig, such as when a driller approaches a high value natural gas or oil reserve.

A need exists for real-time streaming of data and calibrated data from a rig enabling management personnel to view the data from the rig from a remote location, such as from a warm remote location 2,000 miles away from a cold harsh, brutal, arctic drilling site.

A need exists for real-time streaming of data and calibrated data enabling management and rig operators to simultaneously view performance of the drilling operations of multiple rigs to avoid environmental spills and protect the environment by monitoring the wells 24 hours a day, 7 days a week.

A need exists for real-time streaming of data and calibrated data on surface conditions near a well, allowing for quick action to instill protective measures to prevent death on a rig, which can result in a shut down of an entire company, and can dramatically, affect the morale of workers on related rigs owned by the same company.

A need exists for real-time streaming of data and calibrated data during horizontal and directional drilling to prevent intersection of boreholes during multi-hole drilling at a single site.

A need exists for real-time streaming of data and calibrated data to correctly mix drilling muds relative to operations during drilling.

The present embodiments meet these needs.

BRIEF DESCRIPTION OF THE DRAWINGS

The detailed description will be better understood in conjunction with the accompanying drawings as follows:

FIGS. 2A-2C depict computer instructions in the gas processor data storage according to one or more embodiments.

FIG. 3 shows a sequence of steps used to calibrate a gas chromatograph and a total hydrocarbon detector according to one or more embodiments.

Figure 1:
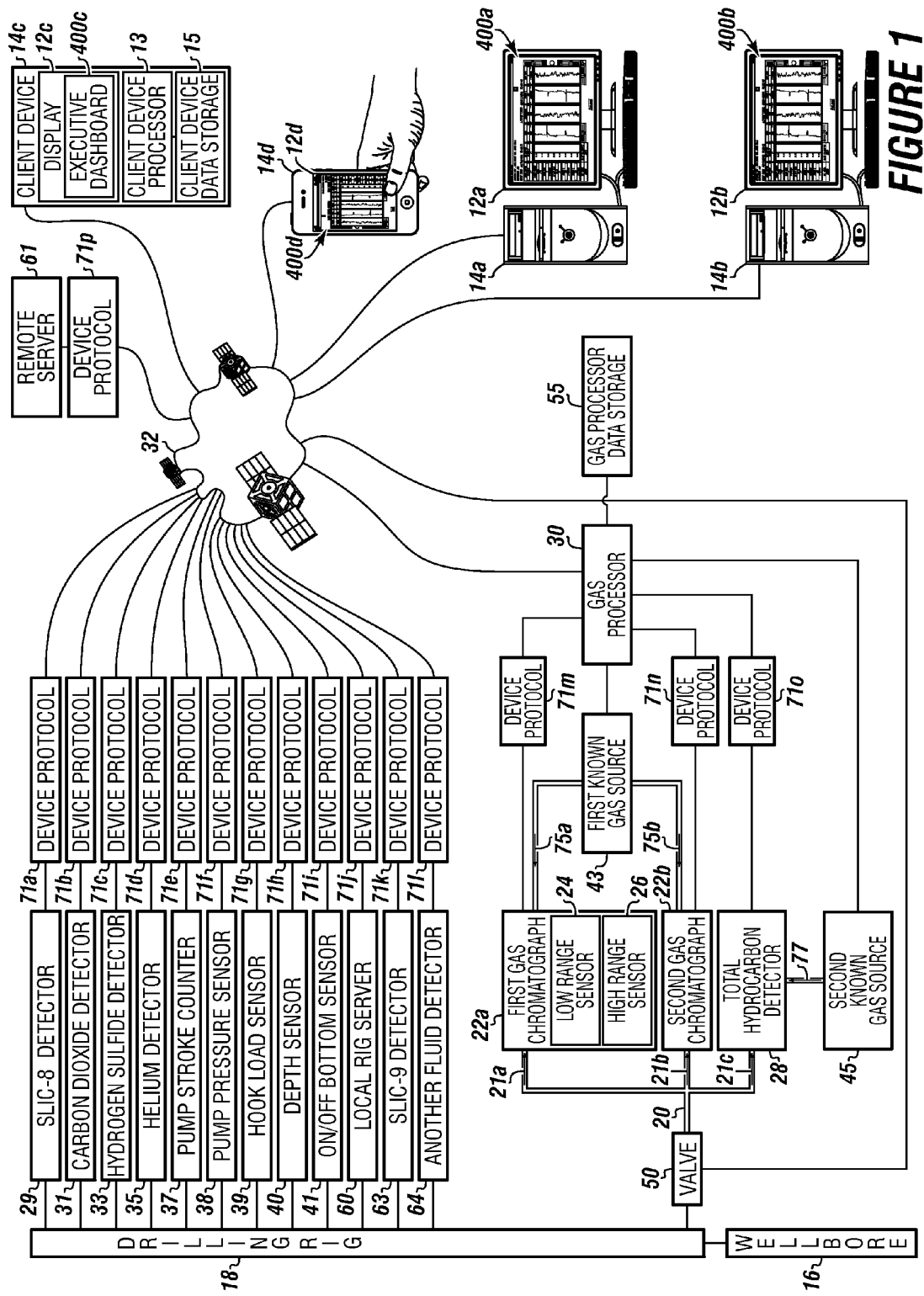
FIG. 1 depicts a schematic showing a system for creating an executive dashboard according to one or more embodiments.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments generally relate to a system for capturing surface data and calculating calibrated data in real time to a user via an executive dashboard of surface logs during the drilling of a well, during work over of a well, after drilling a well, and combinations thereof.

The system enables detection of high range component peaks and low range component peaks of entrained gas in a drilling fluid continuously and pushes the detected data to client devices for immediate action and for governmental environmental protection reporting purposes, and to ensure regulation compliance by a drilling operator.

The system enables a geologist to see great detail in the component gases of the drilling fluid, and greater detail and accuracy of data acquisition, at point of data capture.

The system provides a computer implemented process to provide highly accurate and high integrity data because the system can capture data quickly.

The term "quickly" as used herein can be defined as a sampling density over an interval of time. The system can sample 16 data points per second providing a high density high integrity sampling rate with great detail increasing the integrity of the analysis. The system can sample 4 data points per second for a low density sampling which can be used when data storage is a concern.

The term "real time" as used herein can refer to data which is transmitted at the moment the data is detected by a sensor or detector or at the moment the analysis of a fluid sample is complete.

The system can be used with multiple gas detection instruments simultaneously, wherein each gas detection instruction is based on different gas detection theories. This system can control and run many gas detection instruments simultaneously.

The system can be used with multiple gas detection instruments simultaneously, for bidirectional data exchange with local and remote rig servers wherein each device can have a different well site information transfer specification standard.

The multiple gas detection instruments, such as SLIC-8® and SLIC-9® gas detection instruments made by Selman and Associates, Ltd. of Midland, Tex., are both based on catalytic combustion and thermal conductivity gas detection theories (both theories on both instruments). Each instrument has a total hydrocarbons detector for detecting the total amount of hydrocarbons (measured in percent (%) Equivalent Methane in Air (EMA) or Units) and a gas chromatograph for speciating and measuring the various hydrocarbon components in the gas stream. The gas chromatograph results can be measured in units or ppm.

The system can also connect with a helium detector in a continuously and simultaneously manner. The system also can connect with rig detectors, such as hook load sensors, pump pressure sensor, pump stroke counters, depth sensor, or similar instruments for providing all detail on the instructions simultaneously, providing a highly accurate total view of the rig, the drilling fluid, and the related geology of the drilling.

This system is a single solution when multiple gas detection instruments are required. The system allows a single common system enabling various detection instruments to talk to a single source.

The system can allow for continuous analysis while one sensor or one discipline is turned off or added, and brought online. The system can also allow for commingled sensor and protocol data.

The system can allow a user to monitor a single sensor in a fluid analysis instrument, or to a single or multiple sensors placed on a rig, simultaneously.

The system allows WITS analysis to occur while individual sensor analysis is provided.

The system can enable a user to have a one-stop shopping experience of all the sensor data with an easy to use, desktop executive dashboard.

The system can allow high accuracy with menu driven calibration for the detectors. The data of this system can be accurate to +/−1%.

The system can allow 16 bit results. The accuracy depends on the magnitude of the value. The system allows for at least 65000 different results with an accuracy that is down to sub parts per million levels, such as an accuracy of 0.5 parts per million.

The system can allow precise intervals of measurement of the chromatograph, down to parts per million (ppm) or a percent equivalent methane in air (EMA) in an easy to view environment, such as a WINDOWS® environment for higher accuracy of measurement by allowing detection of high range and low range detection with detail.

For example, the system can allow a user to measure high range and low range signals for the gas chromatograph simultaneously and determine a reading between the high range and low range for highly accurate results providing detailed real time well logs while drilling.

Additionally, the system can perform calibration of a total hydrocarbon detector and a gas chromatograph in one step.

The system can perform calibration of one or more of the analyzers, without human intervention, such as calibrate the total hydrocarbon detector while the gas chromatograph is operating, analyzing and providing information to a gas processor.

It should be noted that the gas processor can be a single gas processor connected to the network and the data storage, or it can be a cloud gas processor, or it can be both types of gas processors connected to the network and data storage The system can produce data to populate a geological-hydrocarbon log, such as a well surface log by real time streaming of detected and analyzed data from drilling operations.

The monitoring can occur at the drilling location, a remote location, or both. As such, the system can allow for simultaneous localized monitoring and remote monitoring.

The remote monitoring and localized monitoring can be performed over a network using at least one client device, such as a laptop, a cellular or mobile phone, a smart phone, a tablet, a netbook, the like, a desktop computer, or other networkable device capable of data processing and storage.

The data can be acquired and stored in a database in the gas processor data storage.

The gas processor can use computer instructions to both create an executive dashboard and then populate the executive dashboard using the data in the database as streamed live from actual rig or fluid detectors or as analyzed, such as from a gas chromatograph and a total hydrocarbon detector.

The gas processor can use computer instructions to transmit the populated executive dashboard over a network to various client devices.

The network can be a fiber optic network, a wired network, such as a Cat5e network, the Internet, a wireless local area network (WLAN), such as WI-FI™, other wireless networks, other wired networks, a satellite network, a cellular network, other communication networks, or combinations thereof.

The gas processor data storage can be one or more data storages and can be a data storage in a computing cloud connected to a cloud gas processor.

Turning now to the Figures, FIG. 1 depicts the overall system for creating an executive dashboard according to one or more embodiments.

The system creates an executive dashboard of a geological hydrocarbon log for simultaneously viewing by a plurality of client devices over a network 24 hours a day, 7 days a week with updates as events and analysis occur.

The system produces at least one executive dashboard 400a, 400b, 400c, and 400d of information containing gas detection information and well logging information in real time onto displays 12a, 12b, 12c, and 12d of client devices 14a, 14b, 14c, and 14d. Each client device 14a, 14b, 14c, and 14d can have a client device data storage 15. The client device data storage 15 is shown connected to a client device processor 13.

The client devices 14a, 14b, 14c, and 14d can be computers, cellular or mobile phones, laptops, tablets, remote terminal units, or the like.

A wellbore 16 is shown being drilled by a drilling rig 18.

A gas processor 30 with a gas processor data storage 55 can contain a calibration table and various computer instructions to create the executive dashboard and to populate the executive dashboard with analytical information.

The gas processor 30 can communicate to at least one fluid detector. The fluid detectors can be a first gas chromatograph 22a, a second gas chromatograph 22b, a total hydrocarbon detector 28, a SLIC-8® detector 29, a carbon dioxide detector 31, a hydrogen sulfide detector 33, a helium detector 35, a SLIC-9® detector 63, another fluid detector 64, and combinations thereof.

The gas processor 30 can communicate to at least one rig detector. The rig detectors can be a pump stroke counter 37, a pump pressure sensor 38, a hook load sensor 39, a depth sensor 40, an on/off bottom sensor 41, and combinations thereof.

Each fluid detector and rig detector can have a device protocol 71a, 71b, 71c, 71d, 71e, 71f, 71g, 71h, 71i, 71k, and 71l.

Each fluid detector and rig detector can be connected to the network 32 for communication with the gas processor 30.

In one or more embodiments, the device protocols of the fluid detectors, rig detectors, and combinations thereof, can be dissimilar. In one or more embodiments, the device protocols of the fluid detectors, rig detectors, and combinations thereof, can be similar.

The gas processor 30 can also communicate with a remote server 61 and a local rig server 60. The remote server 61 can have a device protocol 71p and the local rig server 60 can have a device protocol 71j.

For calibration purposes and for sampling purposes, the gas processor 30 can control a valve 50 for opening and closing fluid sampling conduits 20.

Fluid sample 21a can flow to the first gas chromatograph 22a. The first gas chromatograph 22a can have a low range sensor 24 and a high range sensor 26.

The first gas chromatograph 22a can communicate to a gas processor 30 connected to a gas processor data storage 55.

Fluid sample 21b can flow to the second gas chromatograph 22b. The second gas chromatograph 22b can have a low range sensor and a high range sensor, which are not shown. The second gas chromatograph 22b can communicate to the gas processor 30.

Both gas chromatographs 22a and 22b can be in fluid communication with a first known gas source 43 that flows a first known gas 75a and 75b into the gas chromatographs for calibration.

The first known gas source 43 can be controlled by the gas processor 30.

Fluid sample 21c can flow to the total hydrocarbon detector 28 with at least one gas sensor, which is not shown. The total hydrocarbon detector 28 can communicate directly to the gas processor 30, such as through its device protocol 71o.

The first gas chromatograph 22a can communicate directly to the gas processor 30, such as through its device protocol 71m and the second gas chromatograph 22b can communication directly to the gas processor 30, such as through its device protocol 71n.

The total hydrocarbon detector 28 can be in fluid communication with a second known gas source 45 that can flow a second known gas 77 into the total hydrocarbon detector for calibration. The second known gas source 45 can be controlled by the gas processor 30.

The term "fluid" as used herein can refer to a liquid with gas entrained, a liquid with gas and particulate entrained therein, a gas with vapor particles entrained therein or combinations thereof.

The gas processor 30 can provide bidirectional data exchange with the client devices enabling identical gas detection information to be viewed simultaneously by a plurality of users associated with the client devices.

The gas processor data storage 55 can includes a plurality of computer instructions.

The data storage can be one or more flash drives, internal hard drives, external hard drives, virtual hard drives, floppy disk drives, optical disk drives, other computer readable medium storage devices, the like, or combinations thereof.

In one or more embodiments, the data storages can be configured in a triple redundant architecture. For example, the triple redundant architecture can be a flash drive, a hard drive, and a portable hard drive. In one or more embodiments, the triple redundant architecture can include a hard drive, a CD writer, and a printer. The system can also have redundant gas detection hardware and computer hardware.

The data storages can include computer instructions for instructing one or more of the gas processors to compare the acquired data to preset data limits.

Figure 2B:
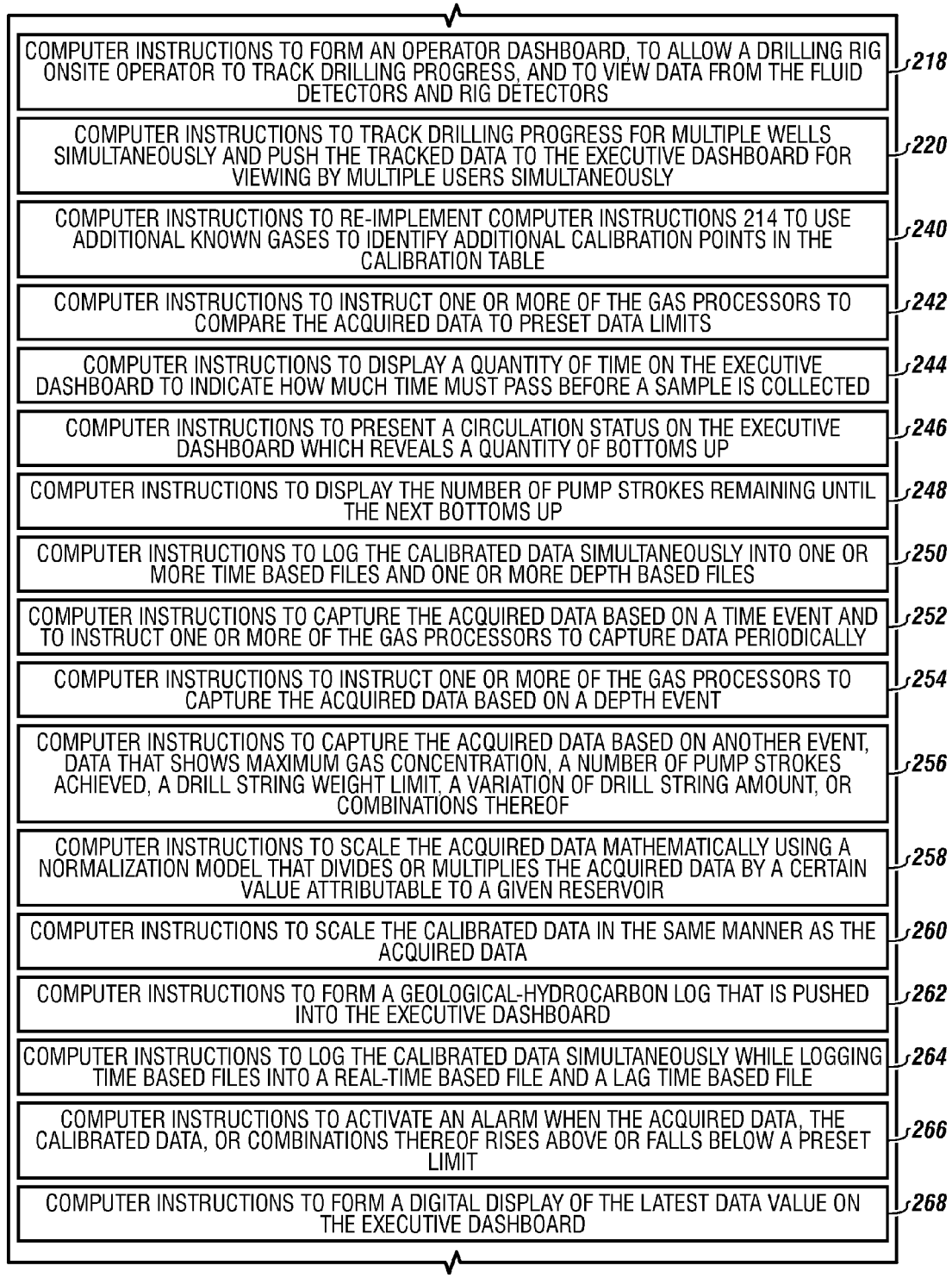

FIGS. 2A-2C depict computer instructions located in the gas processor data storage according to one or more embodiments.

The gas processor data storage 55 can have a plurality of computer instructions to implement the system for creating an executive dashboard of geological-hydrocarbon drilling information for simultaneous viewing, wherein the geological-hydrocarbon drilling information is updated 24 hours a day, 7 days a week as depth based drilling events and time based drilling events occur and as fluid analysis occurs.

The gas processor data storage 55 can have computer instructions 200 to provide a device protocol interface in the gas processor data storage allowing each fluid detector with a device protocol and each rig detector with a device protocol to communicate with the gas processor.

The gas processor data storage 55 can have computer instructions 201 to provide a database stored in the gas processor data storage adapted to receive, store and compile rig detector information, fluid detector information, and combinations thereof, from each fluid detector, rig detector, and combination thereof.

The gas processor data storage 55 can have computer instructions 202 to create an executive dashboard in the gas processor data storage.

The gas processor data storage 55 can have computer instructions 203 to populate the created executive dashboard using the database of rig information, fluid detector information, and combinations thereof from the gas processor data storage and as the information becomes available.

The gas processor data storage 55 can have computer instructions 204 to transmit the populated executive dashboard to one or more of the client devices.

The gas processor data storage 55 can have computer instructions 205 to enable, without shutting down the system, on-line addition and on-line deletion of one or more fluid detectors, one or more rig detectors, and combinations thereof; while the system is operating.

These computer instructions can enable addition and deletion without shutting down all, or a portion of the system.

The gas processor data storage 55 can have computer instructions 206 to instruct the gas processor to calibrate one or more total hydrocarbon detectors, gas chromatographs, using each instrument's device protocol.

The gas processor data storage 55 can have computer instructions 208 to instruct the gas processor to repeat fluid analysis, repeat sensor measuring, and update the executive dashboard as the analyzing, and measuring is completed.

The gas processor data storage 55 can have computer instructions 209 to instruct the gas processor to repeat fluid analysis sensor measuring, and additionally repeat data importing from a local rig server, remote rig server and combinations thereof, and update the executive dashboard as the analyzing, importing, and measuring is completed.

The gas processor data storage 55 can have computer instructions 214 to calibrate the gas chromatograph and the total hydrocarbon detector automatically while other sensing and analysis is occurring by the system These computer instructions can involve instructing the gas processor to: close off the conduit for the fluid sample; identify a known gas source; identify when sensors in the gas chromatograph are stabilized to zero; identify when the sensor in the total hydrocarbon detector is stabilized to zero; inject a known gas from a known source of gas into the gas chromatograph, into the total hydrocarbon detector, or into both devices simultaneously; identify the components of the known gas using the high and low range sensors of the gas chromatograph, identify the components of the known gas using the sensor of total hydrocarbon detector, or combinations thereof; compare the identified components of the known gas to a calibration table for the known gas. The calibration table for the known gas is stored in the gas processor data storage.

These computer instructions can also set span calibration points for the gas chromatograph, and set span calibration points for the total hydrocarbon detector for each identified component using the calibration table; and then stop the injecting of the known gas into the gas chromatograph, into total hydrocarbon detector, or both.

The gas processor data storage 55 can have computer instructions 218 to form an operator dashboard to allow a drilling rig onsite operator to track drilling progress, and to view data from the fluid detectors and rig detectors.

The gas processor data storage 55 can have computer instructions 220 to track drilling progress for multiple wells simultaneously and push the tracked data to the executive dashboard for viewing by multiple users simultaneously.

The gas processor data storage 55 can have computer instructions 240 to involve re-implementing computer instructions 214 to using additional known gases to identify additional calibration points in the calibration table.

Calibration can be performed using equations stored in the gas processor data storage, or by using known standard gas values and comparing these known standard gas values to the acquired data.

For example, the calibration can include comparing the response of a sensor to one or more known parameters, and deriving a correlation between the response of the sensor and the known parameters.

As another example, a gas detection sensor can produce a 100 mV response when exposed to a 1 percent volume of methane, and a correlation between the produced 100 mV response can be derived using techniques known to many geologists to achieve calibration.

The gas processor data storage 55 can have computer instructions 242 to instruct one or more of the gas processors to compare the acquired data to preset data limits.

The gas processor data storage 55 can have computer instructions 244 to display a quantity of time on the executive dashboard to indicate how much time must pass before a sample is collected.

The gas processor data storage 55 can have computer instructions 246 to present a circulation status on the executive dashboard which reveals a quantity of bottoms up.

These computer instructions can specifically count the number of occurrences of bottoms up and can display the time remaining until the next bottoms up.

The term "bottoms up" as used herein can refer to the event when the drilling mud that is used in drilling travels from a drill bit to the surface.

The gas processor data storage 55 can have computer instructions 248 to display the number of pump strokes remaining until the next bottoms up.

The gas processor data storage 55 can have computer instructions 250 to log the calibrated data simultaneously into one or more time based files and one or more depth based files.

The logging of the calibrated data can occur by using predefined limits stored in one or more of the data storages.

The gas processor data storage 55 can have computer instructions 252 to capture the acquired data based on a time event and to instruct one or more of the gas processors to capture data periodically.

For example, these computer instructions can instruct the gas processor to capture desired data once every second. The time period can be any unit of time.

The gas processor data storage 55 can have computer instructions 254 to instruct one or more of the gas processors to capture the acquired data based on a depth event.

For example, the depth event can be when the wellbore is drilled to a certain depth, the drill bit is at a certain depth, or combinations thereof. The depth event can occur using any unit of length. For example, the depth event can be acquired every 1 foot of well depth.

The gas processor data storage 55 can have computer instructions 256 to capture the acquired data based on another event, such as a location of a gamma marker, data that shows maximum gas concentration, a number of pump strokes achieved, such as 100 strokes of a mud pump, a drill string weight limit, a variation of drill string amount, or combinations thereof.

The gas processor data storage 55 can have computer instructions 258 to scale the acquired data mathematically using a normalization model that divides or multiplies the acquired data by a certain value attributable to a given reservoir.

The gas processor data storage 55 can have computer instructions 260 to scale the calibrated data in the same manner as the acquired data.

The gas processor data storage 55 can have computer instructions 262 to form a geological-hydrocarbon log that is pushed into the executive dashboard.

The executive dashboard of both "raw" and calibrated data can be displayed to rig operators, rig owners, and safety experts simultaneously allowing multiple users of client devices to be able to detect the presence of a high value of gas and trigger an alarm to workers on the drilling rig to take precautions. As such, the executive dashboard system can enable quick evaluations of the calibrated data to modify drilling operations, to confirm locations of known hydrocarbon reserves, and to ascertain new locations of hydrocarbon reservoirs.

The gas processor data storage 55 can have computer instructions 264 to log the calibrated data simultaneously while logging time based files into a real-time based file and a lag time based file.

For example, the real-time based file can capture an array of numbers, including a time of day and date, the wellbore depth, units of total gas, and a chromatogram showing gas composition. The lag time based file can include a time of day offset by the amount of time the data takes to move from a bit to a data collection device at the surface, units of total gas, and a gas composition. The logged data can be presented on the executive dashboard.

The gas processor data storage 55 can have computer instructions 266 to activate an alarm when the acquired data, the calibrated data, or combinations thereof rises above or falls below a preset limit.

The alarm can be a visual alarm, an audio alarm, or combinations thereof. For example, the alarm can be an alert appearing on one or more displays in communication with one or more gas processors.

The alarm can be an activation of a ring tone of one or more client devices, an activation of an audio alarm in communication with the gas processor, or combinations thereof. The alarm can also include activation of a light by one or more of the gas processors, or activation of another device on the rig or adjacent to the wellbore that emits a light, sound, or both. The alarm can also include an email, an instant message, a text message, or combinations thereof transmitted to one or more users.

The gas processor data storage 55 can have computer instructions 268 to form a digital display of the latest data value on the executive dashboard.

The gas processor data storage 55 can have computer instructions 270 to form an identifier for the data being tracked on the executive dashboard.

The gas processor data storage 55 can have computer instructions 272 to form a switch index mode button on the executive dashboard.

The gas processor data storage 55 can have computer instructions 274 to form a layout data tracks button to control of the size, number, and type of data tracks on the screen on the executive dashboard.

The gas processor data storage 55 can have computer instructions 276 to form an upper scale bound section on the executive dashboard.

The gas processor data storage 55 can have computer instructions 278 to form a lower scale bound section on the executive dashboard.

The gas processor data storage 55 can have computer instructions 280 to form a menu button on the executive dashboard.

The gas processor data storage 55 can have computer instructions 282 to form a scroll left button, a scroll right button, a zoom in button, a scroll down button, a scroll up button, and a zoom out button on the executive dashboard.

The gas processor data storage 55 can have computer instructions 284 to form an alarm indicator that can change color to indicate if the alarm is on or off on the executive dashboard.

The gas processor data storage 55 can have computer instructions 286 to form a "my tool" button on the executive dashboard.

The gas processor data storage 55 can have computer instructions 288 to form a help button on the executive dashboard.

The gas processor data storage 55 can have computer instructions 290 to present the calibrated data on the operator dashboard.

The gas processor data storage 55 can have computer instructions 292 to present a graphical representation of acquired chromatographic data on the operator dashboard.

The gas processor data storage 55 can have computer instructions 293 to present the operator data track sections on the operator dashboard.

The gas processor data storage 55 can have computer instructions 294 to present an acquired data section on the operator dashboard.

The gas processor data storage 55 can have computer instructions 295 to present a calibrated drilling data section and an alarm set section on the operator dashboard.

FIG. 3 shows a sequence of steps used to automate online calibration of the gas chromatograph and a total hydrocarbon detector according to one or more embodiments.

The sequence of steps to calibrate at least one gas chromatograph and at least one total hydrocarbon detector can include closing off the conduit that passes the fluid sample to the gas chromatograph, total hydrocarbon detector, or both, as illustrated in box 300. This can be done by closing off the valve.

The sequence of steps can include using the gas processor to identify a known gas source, as illustrated in box 302.

The first known gas source can have a first known gas and can be split into two first known gas source streams. Each first known gas stream can be transmitted to a different gas chromatograph. A first stream can flow to a first gas chromatograph and a second stream can flow to a second gas chromatograph. In one or more embodiments, more than two gas chromatographs can be used and in other embodiments two gas chromatographs may not be needed.

The second known gas source can have a second known gas. The known gases can have known gas values that can be used to create span calibration points. The known gas values can be stored in a calibration table in the gas processor data storage.

The sequence of steps can include using the gas processor to identify when the sensors in the gas chromatograph(s) and the sensor in the total hydrocarbon detector are stabilized at or near zero, as illustrated in box 304.

The sequence of steps can involve using the gas processor to inject a first known gas into the gas chromatographs, the second known gas into the total hydrocarbon detector which in embodiments can be a simultaneous injection, as illustrated in box 306.

In an embodiment, the known gas injected into the gas chromatograph can be different form the known gas injected into the total hydrocarbon detector. More than two different known gases can be used simultaneously for calibration in an embodiment.

The sequence of steps can involve using the gas processor to cause the components of the known gas to be identified in the gas chromatograph, total hydrocarbon detector, or both, as illustrated by box 308.

The sequence of steps can involve using the gas processor to compare the identified components of the known gas to a calibration table stored in the gas processor data storage, as illustrated by box 310.

The sequence of steps can involve using the gas processor to set span calibration points for the gas chromatograph, and the total hydrocarbon detector for each identified component using the calibration table and the identified components of the known gases, as illustrated by box 312.

The sequence of steps can involve using the gas processor to stop injecting the known gas into the gas chromatograph (s), the total hydrocarbon detector, or both after the span calibration points are set, as illustrated by box 314.

The sequence of steps can involve repeating steps 302 to 314 with additional known gases to identify additional calibration points using the calibration table, as illustrated by box 316.

The sequence of steps can involve opening the conduit that passes the fluid sample to the gas chromatograph, total hydrocarbon detector, or both, as illustrated by box 318.

Figure 4:
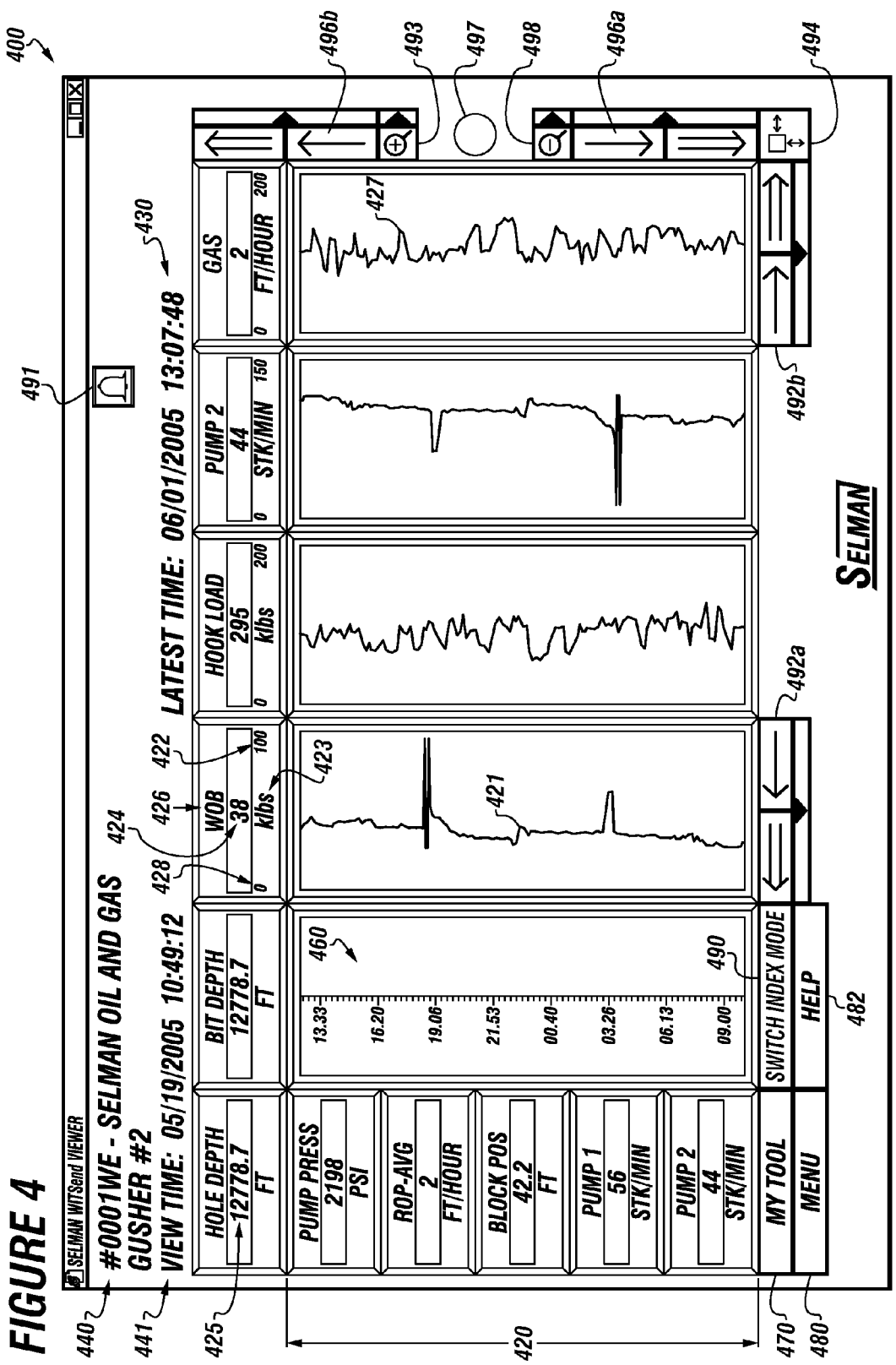
FIG. 4 depicts the executive dashboard according to one or more embodiments.

FIG. 4 depicts the executive dashboard according to one or more embodiments.

The executive dashboard 400 can contain directly measured data 421, such as hook load sensor values, imported measured data 425, such as hole depth, depth over WITS information, analyzed measured data 427, such as total hydrocarbon readings, and combinations thereof.

The executive dashboard 400 can includes a plurality of digital data track displays 420. The plurality of digital data track displays 420 can display data associated with drilling operations.

For example the plurality of digital data track displays 420 can display weight on bit data, bit depth, hole depth, pump pressure, block pressure, pump stroke data, hook load, and the like.

The plurality of digital data track displays 420 can each have an upper scale bound section 422, shown as "100 klbs", a lower scale bound section 428, shown as "0 klbs", a unit section 423, shown as "klbs", a digital display of the latest data value 424, shown as "38", and an identifier for the data being tracked 426, shown as "WOB," which represents "weight on bit". A graphic representation of the weight on bit is shown using directly measured data 421.

The executive dashboard 400 can not only provide directly measured data 421, but also imported measured data 425, analyzed measured data 427, shown as "GAS" which is a total hydrocarbon reading in feet per hour, and combinations thereof.

The executive dashboard 400 can also include a section for indicating a time stamp 430 for the last time data was downloaded from one of the servers, from the gas processor, or from the rig detectors; and an identifier number section 440.

The identifier number section 440 can include an invoice number, shown as "0001WE—Selman Oil and Gas Gusher #2".

The executive dashboard 400 can also have a current view time section 441, which can indicate a time stamp for the current values being displayed by the graphical data track sections. The graphical track sections shown are: "hole depth," "bit depth," "weight on bit," "hook load," "pump2," and "gas".

The graphical track section "bit depth" is indicated as a time vs. depth value graph 460.

A my tool button 470 can be displayed on the executive dashboard 400. The my tool button 470 can be used to execute an action of a tool that can be picked by a user using a menu button 480.

The menu button 480 can be displayed on the executive dashboard 400, and can be used to open up choices allowing the user to configure the display.

In addition, a help button 482 can be displayed and used to retrieve instructions or guidance on operating the executive dashboard 400.

The executive dashboard 400 can have a switch index mode button 490, which can allow the user to switch between plotting by a time index and a depth index.

The user can scroll data tracks using a scroll left button 492a, a scroll right button 492b, a scroll down button 496a, and a scroll up button 496b.

The layout of the data tracks can be adjusted by a user using the layout data tracks button 494. The layout data tracks button 494 can allow control of the size, number, and type of data tracks on the screen.

The executive dashboard 400 can be configured to allow the user to increase the magnification using the zoom in button 493, and to decrease the magnification using the zoom out button 498.

The executive dashboard 400 can also include a status indicator 497 that can change colors to indicate one or more status of the drilling operation, and can also provide a visual indication that data is being received. For example, the status indicator 497 can display a green color if on bottom and a red color if off bottom.

The executive dashboard 400 can also be used to turn an alarm on and off. The executive dashboard 400 can have an alarm indicator 491 that can change color to indicate if the alarm is on or off. The alarm indicator 491 can be clicked to turn off the alarm or turn on the alarm.

The system can include multiple gas chromatographs enabling user to sample multiple times for higher quality data, and for viewing of large and small concentrations of gas simultaneously. The data can be viewed in different scales.

Preset data limits usable to create alarms can be stored in one or more of the data storages or on another computer readable medium in communication with the gas processor.

In one or more embodiments, the gas processor can be a computer.

Embodiments of the system can enable multiple users of client devices to view the executive dashboard of single well information or multiple wells information simultaneously. The system can allow a plurality of wells to be analyzed simultaneously by a single user or by a plurality of users.

The system can include computer instructions to log the calibrated data simultaneously into one or more time based files and one or more depth based files.

The logging of the calibrated data can occur by using predefined limits stored in one or more of the data storages.

The preset limits can be set by an operator on the rig or by a remote user in communication with one or more of the gas processors via the network or both.

The executive dashboard that can be formed using computer instructions stored in a cloud based server data storage, a cloud based data storage, a client device data storage, or combinations thereof.

Figure 5:
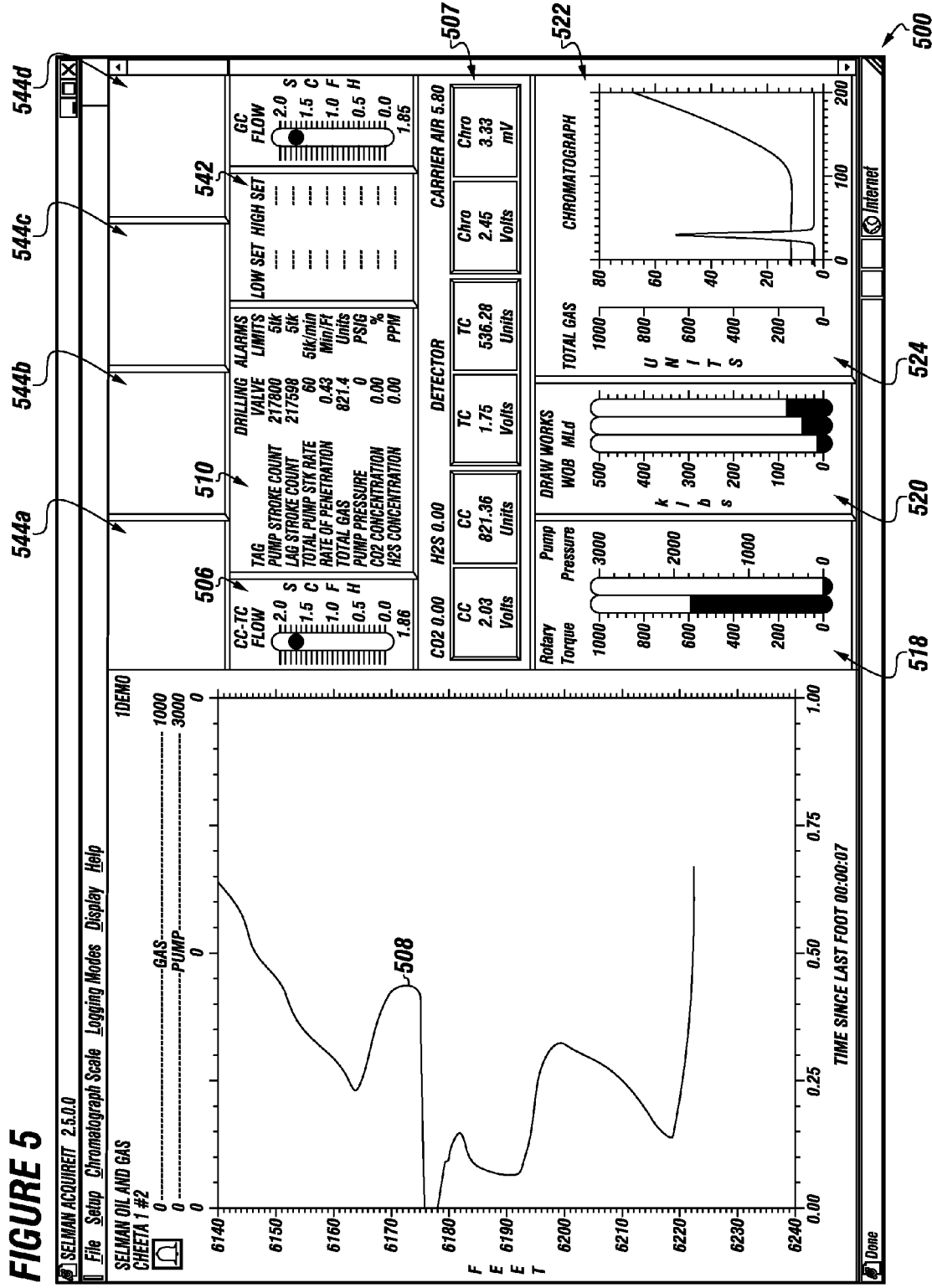
FIG. 5 depicts an operator dashboard created with the system according to one or more embodiments.

FIG. 5 depicts an operator dashboard created with the system according to one or more embodiments.

The operator dashboard 500 can include a graphical representation of calibrated data 508, a representation of calibrated data related to flow rates 506, an acquired data section 507, pressure display 518, a calibrated drawworks section 520, a graphical representation of acquired chromatographic data 522, an alarm set section 542, and a calibrated chromatographic data section 524. The calibrated chromatograph data section 524 can display important voltage parameters for a chromatograph data collection device acquiring the data.

It should be noted in an embodiment, the graphical representation of calibrated data 508 can be scaled with computer instructions. The computer instructions can scale the calibrated data enabling a user to view the entire range of calibrated values on the executive dashboard.

The operator dashboard 500 can also include operator data track sections 544a, 544b, 544c, and 544d. The operator data track sections 544a, 544b, 544c, and 544d can display calibrated data associated with one or more drilling operations. For example, the operator data track sections 544a, 544b, 544c, and 544d can display hydrocarbon data, depth data, or other data.

The alarm set section 542 can include a section for an operator to input or select alarm criteria. For example, the operator can set a low value alarm point, a high value alarm point, or both. As such, if drilling data, such as calibrated drilling data represented in a representation of calibrated drilling data section 510, reaches one of the alarm points, an alarm can be issued.

In an embodiment, the device protocols can be selected form the group of standard industry protocols comprising: WITS, WITSml; RS-232; RS-485, TCPIP; a 4 to 20 mA protocol; a Measurement Computing USB communication protocol; a Lawson Labs USB communication protocol; a switch closure measurement; and combinations thereof.

Like the executive dashboard, in an embodiment, an operator dashboard can be formed using computer instructions installed in the data storages. The operator dashboard can display the well condition and the drilling conditions in real-time. The operator dashboard can display real-time information continuously.

The operator dashboard can allow the tracking of one or more drilling operations. The operator dashboard can display information related to the drilling operations. For example, the operator dashboard can display drill bit depth, wellbore depth, a time clock, a time to drilling transition, a chromatograph screen, time until the shift supervisor shows up on the rig floor, other operation data, or combinations thereof.

The operator dashboard can track drilling progress, any and all drilling data, and portions of data from any data collection device, as well as any number of time, depth, or other events simultaneously. Events can include completion of a preset number of pump strokes.

In embodiments, a user can view both the executive dashboard and the operator dashboard simultaneously to make fast safety decisions during drilling to save the lives of operators and rough necks on the rig.

While these embodiments have been described with emphasis on the embodiments, it should be understood that within the scope of the appended claims, the embodiments might be practiced other than as specifically described herein.

What is claimed is:

1. A system for creating a geological-hydrocarbon drilling log during gas detection and monitoring of at least one drilling operation using fluid samples from a well for simultaneous viewing on a plurality of client devices, each client device having a display for communication over a network, wherein the geological-hydrocarbon drilling log is updated 24 hours a day, 7 days a week as depth based drilling events occur, time based drilling events occur, and as fluid analysis occurs, wherein the system comprises:
   a) a gas processor with a gas processor data storage in communication with the network, wherein the gas processor and the gas processor data storage communicate with at least one client device of the plurality of client devices;
   b) at least one fluid detector for measuring chemical content of a fluid sample from a wellbore, wherein the at least one fluid detector is at least one of: a gas chromatograph, a total hydrocarbon detector, a carbon dioxide detector, a hydrogen sulfide detector, and a helium detector, wherein the at least one fluid detector provides a chemical content analysis of fluid from the wellbore to the gas processor data storage using the network;
   c) at least one rig detector for measuring a fluid sample from the well, the at least one rig detector connected to the network, wherein the at least one rig detector is at least one of: a pump stroke counter, a pump pressure sensor, a hook load sensor, a depth sensor, and an on/off bottom sensor, wherein each fluid detector and each rig detector have an individual device protocol, wherein each fluid detector and each rig detector are in communication with the gas processor, using the network;
   d) computer instructions to provide a device protocol interface in the gas processor data storage allowing each fluid detector and each rig detector to communicate directly with the gas processor with each individual device protocol;
   e) computer instructions in the gas processor data storage to provide a database adapted to receive, store and compile rig detector information, fluid detector information, or combinations thereof, from each fluid detector, each rig detector, or combinations thereof;
   f) computer instructions in the gas processor data storage creating an executive dashboard, the executive dashboard comprising:
      1. a plurality of digital data track displays displaying digital data associated with drilling operations;
      2. a unit section within at least one of the plurality of digital data track display;
      3. a digital display of a latest data value;
      4. an identifier for the digital data being tracked;
      5. a time versus depth value graph depicting time and depth simultaneously;
      6. a switch index mode button for allowing a user to switch between plotting by a time index and plotting by a depth index;
      7. a layout of data tracks button connected to computer instructions to control size, number, and type of data tracks on the executive dashboard; and
      8. a status indicator that can change colors to indicate one or more status of the drilling operation and provide a visual indication that digital data are being received from the at least one rig detector, the at least one fluid detector, or both;
   g) computer instructions in the gas processor data storage to populate the created executive dashboard using the database of rig information, fluid detector information, or combinations thereof;
   h) computer instructions in the gas processor data storage to form an operator dashboard to track drilling progress, and populate the operator dashboard using data from the at least one fluid detector and the at least one rig detector, wherein the operator dashboard comprises: (1) a graphical representation of calibrated data, (2) a graphical representation of acquired chromatographic data, (3) a calibrated chromatographic data section and (4) at least one operator data track section;
   i) computer instructions in the gas processor data storage to transmit the populated executive dashboard and the populated operator dashboard to one or more of the plurality of client devices enabling the user of at least one of the plurality of client devices to view both the populated executive dashboard and the populated operator dashboard simultaneously;
   j) computer instructions in the gas processor data storage for continuous analysis of fluid coming from the wellbore by the at least one rig detector and the at least one fluid detector while one sensor or one detector is turned off, added, or brought online for online addition and online deletion of one or more fluid detectors, one or more rig detectors, and combinations thereof; while the system is operating and without shutting down all, or a portion of the system other than the one sensor or one detector that is to be turned off, added or brought online for online addition and online deletion;
   k) computer instructions in the gas processor data storage to calibrate online the at least one fluid detector, using the device protocol interface and each fluid detector's individual device protocol using a known gas and creating a calibration table and then calibrating the at least one fluid detector to analyze the fluid samples from the well; and
   l) computer instructions in the gas processor data storage to repeat fluid analysis and sensor measuring, and to update the populated executive dashboard and the populated operator dashboard as the fluid analysis and sensor measuring is completed.

2. The system of claim 1, further comprising a local rig server, a remote rig server, and combinations thereof, connected to the network for communication with the gas processor, and further comprising computer instructions to repeat fluid analyzing, sensor measuring, and additionally repeat data importing from the local rig server, remote rig server and combinations thereof, to update the executive dashboard as the analyzing, importing, and measuring is completed.

3. The system of claim 1, further comprising computer instructions to calibrate the at least one fluid detector, automatically.

4. The system of claim 3, wherein the at least one fluid detector comprises the gas chromatograph or the total hydrocarbon detector, and wherein the computer instructions to calibrate the at least one fluid detector using the device protocol interface and each fluid detector's individual device protocol to instruct the gas processor to perform the following:
   a) close off a conduit that passes a fluid sample to the gas chromatograph, the total hydrocarbon detector, or both;
   b) identify when sensors in the gas chromatograph or sensors in the total hydrocarbon detector are stabilized at or near zero;

c) inject a first known gas into the gas chromatograph, a second known gas into the total hydrocarbon detector, or both;

d) cause components of the first known gas, the second known gas, or both, to be identified in the gas chromatograph, total hydrocarbon detector, or both;

e) compare the identified components of the first known gas, the second known gas, or both to a calibration table for the first known gas, the second known gas, or both, wherein the calibration table is stored in the gas processor data storage;

f) set span calibration points for the gas chromatograph, and the total hydrocarbon detector, or both for each identified component from the first known gas, the second known gas, or both, into the calibration table;

g) stop injecting the first known gas, the second known gas, or both into the gas chromatograph, the total hydrocarbon detector, or both;

h) re-implement calibration with additional known gases to identify additional calibration points in the calibration table; and i) open the conduit that passes the fluid sample to the gas chromatograph, total hydrocarbon detector, or both.

5. The system of claim 4, further comprising a valve for opening and closing the conduit for flowing the fluid sample to the gas chromatograph or total hydrocarbon detector.

6. The system of claim 4, wherein the gas chromatograph has a low range sensor and a high range sensor.

7. The system of claim 1, wherein the operator dashboard further comprises: an acquired data section, a calibrated drilling data section, and an alarm set section that includes a section for an operator to input or select alarm criteria.

8. The system of claim 7, wherein the operator dashboard further comprises: a representation of calibrated data related to flow rates, a pressure display, and a calibrated drawworks section.

9. The system of claim 1, further comprising computer instructions in the gas processor data storage to track drilling progress for multiple wells simultaneously using the executive dashboard.

10. The system of claim 1, further comprising computer instructions in the gas processor data storage for displaying a quantity of time on the executive dashboard to indicate how much time must pass before a sample is collected.

11. The system of claim 1, further comprising computer instructions in the gas processor data storage for presenting a circulation status on the executive dashboard which reveals a quantity of bottoms up.

12. The system of claim 1, further comprising computer instructions in the gas processor data storage to activate an alarm when acquired data, calibrated data, or combinations thereof, are above or below a preset limit.

13. The system of claim 1, further comprising computer instructions in the gas processor data storage to scale calibrated data enabling a user to view an entire range of calibrated values on the executive dashboard.

14. The system of claim 1, wherein the executive dashboard further comprises an upper scale bound section, a lower scale bound section, an identifier number section, a graphical data track section, a menu button, a scroll left button, a scroll right button, a zoom in button, a scroll down button, a scroll up button, a zoom out button, or an alarm indicator that can change color to indicate if the alarm is on or off.

15. The system of claim 14, wherein the executive dashboard further comprises a time stamp for the last time data was downloaded, a current view time section, a "my tool" button, and a help button.

* * * * *